(12) United States Patent
Bney-Moshe

(10) Patent No.: US 7,743,195 B2
(45) Date of Patent: Jun. 22, 2010

(54) INTERRUPT MAILBOX IN HOST MEMORY

(75) Inventor: Amiel Bney-Moshe, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 11/645,892

(22) Filed: Dec. 27, 2006

(65) Prior Publication Data
US 2008/0162763 A1 Jul. 3, 2008

(51) Int. Cl.
G06F 13/24 (2006.01)
(52) U.S. Cl. .................. 710/263; 710/268
(58) Field of Classification Search ......... 710/260–269, 710/48–50, 112
See application file for complete search history.

(56) References Cited

U.S. PATENT DOCUMENTS

| | | | | |
|---|---|---|---|---|
| 5,881,296 A * | 3/1999 | Williams et al. | ............ | 710/263 |
| 5,913,045 A * | 6/1999 | Gillespie et al. | ............ | 710/311 |
| 6,128,672 A * | 10/2000 | Lindsley | ....................... | 710/19 |
| 6,240,483 B1 * | 5/2001 | Gutta et al. | ................. | 710/260 |
| 6,256,699 B1 * | 7/2001 | Lee | ............................. | 710/310 |
| 6,301,630 B1 * | 10/2001 | Chen et al. | ................... | 710/310 |
| 6,434,630 B1 * | 8/2002 | Micalizzi et al. | ............... | 710/5 |
| 6,647,431 B1 * | 11/2003 | Utas | ........................... | 719/313 |
| 7,124,225 B2 * | 10/2006 | Yao | ............................. | 710/266 |
| 7,257,658 B2 * | 8/2007 | Winkler et al. | .............. | 710/266 |
| 7,421,431 B2 * | 9/2008 | Zimmer et al. | ................ | 707/8 |
| 2006/0047877 A1 * | 3/2006 | Winkler et al. | .............. | 710/260 |
| 2007/0260796 A1 * | 11/2007 | Grossman et al. | ........... | 710/269 |
| 2008/0114916 A1 * | 5/2008 | Hummel et al. | ............. | 710/266 |

* cited by examiner

Primary Examiner—Raymond N Phan
(74) Attorney, Agent, or Firm—Lee & Hayes, PLLC; Jason F. Lindh

(57) ABSTRACT

Embodiments of an interrupt mailbox in host memory are described herein. In an implementation, a device connected to a host writes interrupt data corresponding to an interrupt generated by the device to host memory. Then, the host, when processing the interrupt, accesses the interrupt data from the host memory.

13 Claims, 4 Drawing Sheets

INTERRUPT MAILBOX IN HOST MEMORY

BACKGROUND

In a host computing system a variety of interconnects may be used to interconnect components, one to another. Therefore, a variety of communications may occur between components via the interconnects. When a component device needs attention of the host or when an error occurs, for instance, interrupt messages may be communicated via the interconnects to signal to the host to attend to the device, such as by providing processing time or other resources. One traditional technique to process these interrupt messages is for the host, when the interrupt is due to be processed, to access data regarding the interrupts from memory of the component generating the interrupt. However, this access of interrupt data from a component via the interconnect may be relatively slow, which often results in delays and "ties up" the resources of the host.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to employ interrupt mailbox in host memory techniques. Exemplary devices and procedures are then described that may be employed in the exemplary environment, as well as in other environments.

Exemplary Environment

Figure 1:
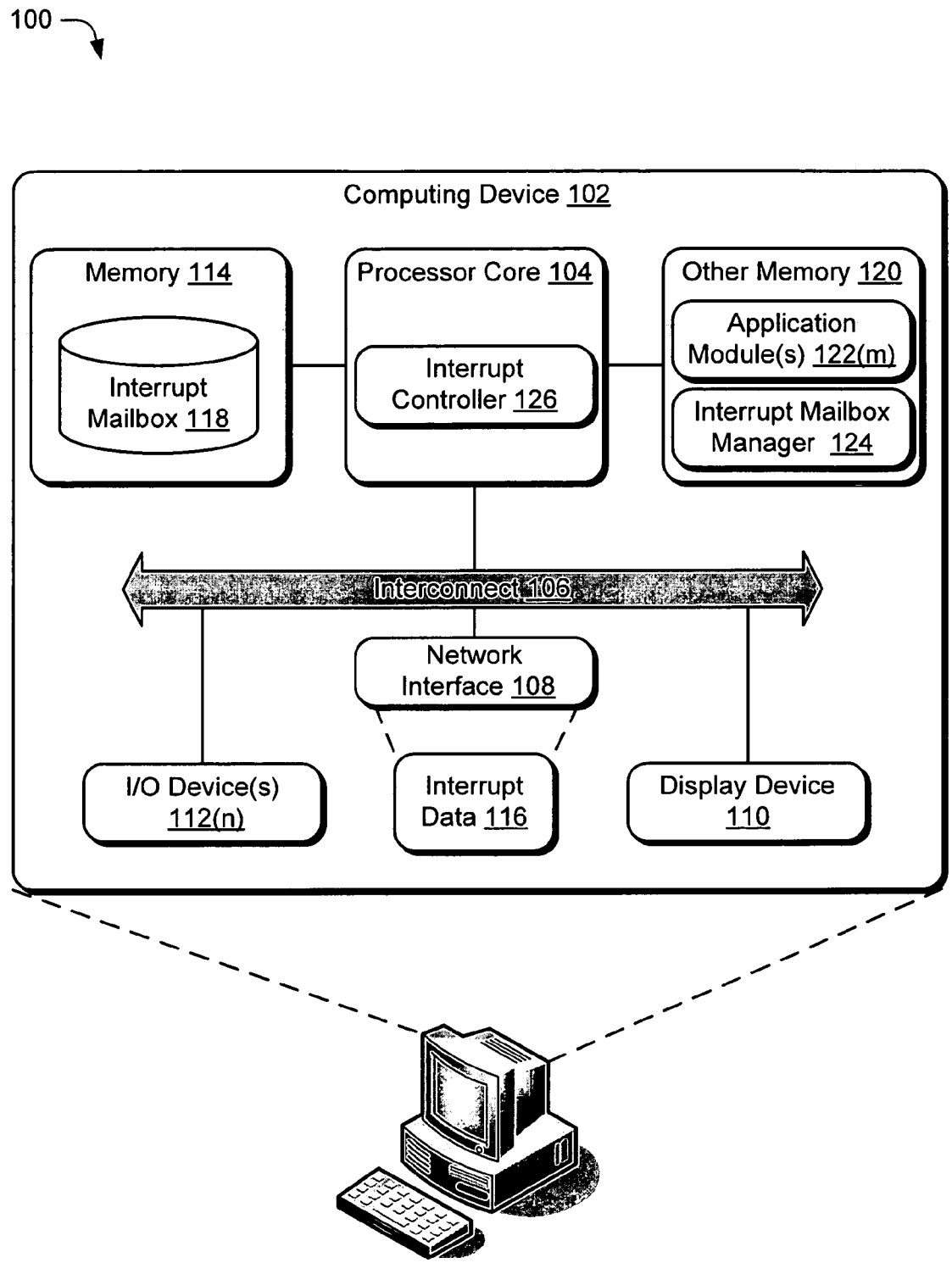
FIG. 1 is an illustration of an environment in an exemplary implementation that is operable to employ techniques to employ an interrupt mailbox in host memory.

FIG. 1 illustrates an exemplary implementation of an environment 100 that is operable to employ interrupt mailbox in host memory techniques described herein. The environment 100 is depicted as having a computing device 102 which includes a processor core 104. Computing device 102 represents a variety of host devices/systems which may be configured in a variety of ways including but not limited to a desktop personal computer (PC), a laptop, an ultra mobile pc (UMPC), a handheld computing device, a game console, a multimedia appliance, a digital recording device for audio/video, and so forth. The processor core 104 represents a processing unit of any type of architecture which has the primary logic, operation devices, controllers, memory systems, and so forth of the computing device 102. For instance, the processor core 104 may incorporate one or more processing devices and a chipset having functionality for memory control, input/output control, graphics processing, and so forth. A variety of configurations of a processor core 104 are contemplated examples of which are further discussed in relation to FIG. 2.

In an implementation, the processor core 104 may be communicatively coupled via an interconnect 106 to a network interface 108 device, a display device 110 (e.g., a liquid crystal display), and/or a plurality of input/output (I/O) devices 112($n$). The interconnect 106 represents the primary high speed interconnects between components/devices of the host computing device 102, such as those employed in traditional computing chipsets. The interconnect 106 may be point-to-point or connected to multiple devices (e.g., bussed). It is contemplated that the interconnect 106 may also represent a variety of interconnect and/or bus technology used individually or in various combinations including but not limited to Peripheral Component Interconnect (PCI), or PCI Express (PCI-e). Other types of interconnects suitable for communication of interrupt messages among components of a host system are also contemplated.

The network interface 108 device represents functionality to provide the computing device 102 a connection to one or more networks, such as the Internet, an intranet, a peer-to-to peer network, and so on. The network interface 108 may be configured to provide a wireless and/or wired connection, and to perform a variety of signal processing functions associated with network communications. The display 110 may be configured in variety of ways including but not limited to a conventional monitor, a liquid crystal display (LCD), a projector, and so forth. The I/O devices 112($n$) represent a variety of I/O devices which may be provided to perform I/O functions, examples of which include controllers/devices for input functions (e.g., keyboard, mouse, trackball, pointing device), media cards (e.g., audio, video, graphic), network cards and other peripheral controllers, LAN cards, speakers, camera, and so forth.

Processor core 104 may also be coupled via a memory bus to a memory 114 which in an embodiment represents "main" memory of the computing device 102 and which may be utilized to store and/or execute system code and data. The "main" memory 114 may be implemented with dynamic random access memory (DRAM), static random access memory (SRAM), or any other types of memories including those that do not need to be refreshed. The "main" memory 114 may include multiple channels of memory devices such as DRAMs. The DRAMs may include Double Data Rate (DDR2) devices. Memory 114 may also be configured to maintain interrupt data 116 in a defined storage, such as the interrupt mailbox 118 depicted in FIG. 1.

The interrupt data 116 in FIG. 1 is depicted as generated via the network interface 108, however it is contemplated that the interrupt data 116 may be produced by a variety of devices connected to the computing device 102, such as the display device 110 and/or the plurality of input/output devices 112 ($n$). In an embodiment, the interrupt mailbox 118 defined in the memory 114 may represent a data storage (e.g., a database) which correspond to a single one of the devices, such as corresponding particularly to network interface 108, and therefore configured to stores data for the single device. Thus, a plurality of mailboxes similar to the depicted interrupt mailbox 118 may be defined in memory 114 of the computing device, each of which corresponds to a single device. Additionally or alternatively, an interrupt mailbox 118 may be configured to manage and/or store interrupt data 116 in common for a plurality of devices. Further discussion of exemplary configurations of an interrupt mailbox 118 may be found in relation to FIG. 2.

Other memory 120 may also be provided which represents a variety of storage such as hard drive memory, removable media drives (for example, CD/DVD drives), card readers, flash memory and so forth. The other memory may be connected to the processor core 104 in a variety of ways such as via Integrated Drive Electronics (IDE), Advanced Technology Attachment (ATA), Serial ATA (SATA), Universal Serial Bus (USB), and so on. Other memory 120 is depicted as storing a variety of application modules 122(m) which may be executed via processing components and memory components to provide a variety of functionality to the computing device 102. Examples of application modules 122(m) include but are not limited to an operating system, a browser, office productivity modules, games, email, photo editing and storage, multimedia management/playback, and so on. A variety of other examples are also contemplated.

An interrupt mailbox manager 124 module is depicted as stored in memory 120 and may also be executed via the processor core 104, although other implementations are also contemplated. Interrupt mailbox manager 124 module is representative of a variety of functionality to form, maintain, and utilize the interrupt mailbox 118 for interrupt handling and/or processing. Such functionality may include but is not limited to defining the mailbox 118, causing interrupt data from one or more components/device to be stored in the memory, communication to the associated devices, receiving interrupts for processing, accessing data from the mailbox 118 to process the interrupts, and so on. An interrupt controller 126 is also depicted within processor core 104 which is representative of a variety of functionality to manage the interconnect 106 and/or interrupts for devices connected via the interconnect 106 such as the network interface 108, I/O devices 112(n), and so on. For instance, the interrupt controller 126 may detect/receive interrupt messages generated by a plurality of devices to signal the attention of the computing device 102, manage an interrupt queue, allocate resources such as processing time based upon the queue, provided interrupts and commands to associated components, cause execution of or call an associated module such as the interrupt mailbox manager 124 module, and so forth. For instance, interrupt controller 126 may receive an interrupt message from a device such as network interface 108, and may provide the interrupt, and indication that the interrupt has occurred, and/or resource allocation to an associated driver module, such as to interrupt mailbox manager 124 module, configured to process/respond to the interrupt. The interrupt mailbox manager 124 may obtain interrupt data 116 related to the interrupt from the interrupt mailbox 118 to process/respond to the interrupt, in accordance with the techniques described herein.

Figure 2:
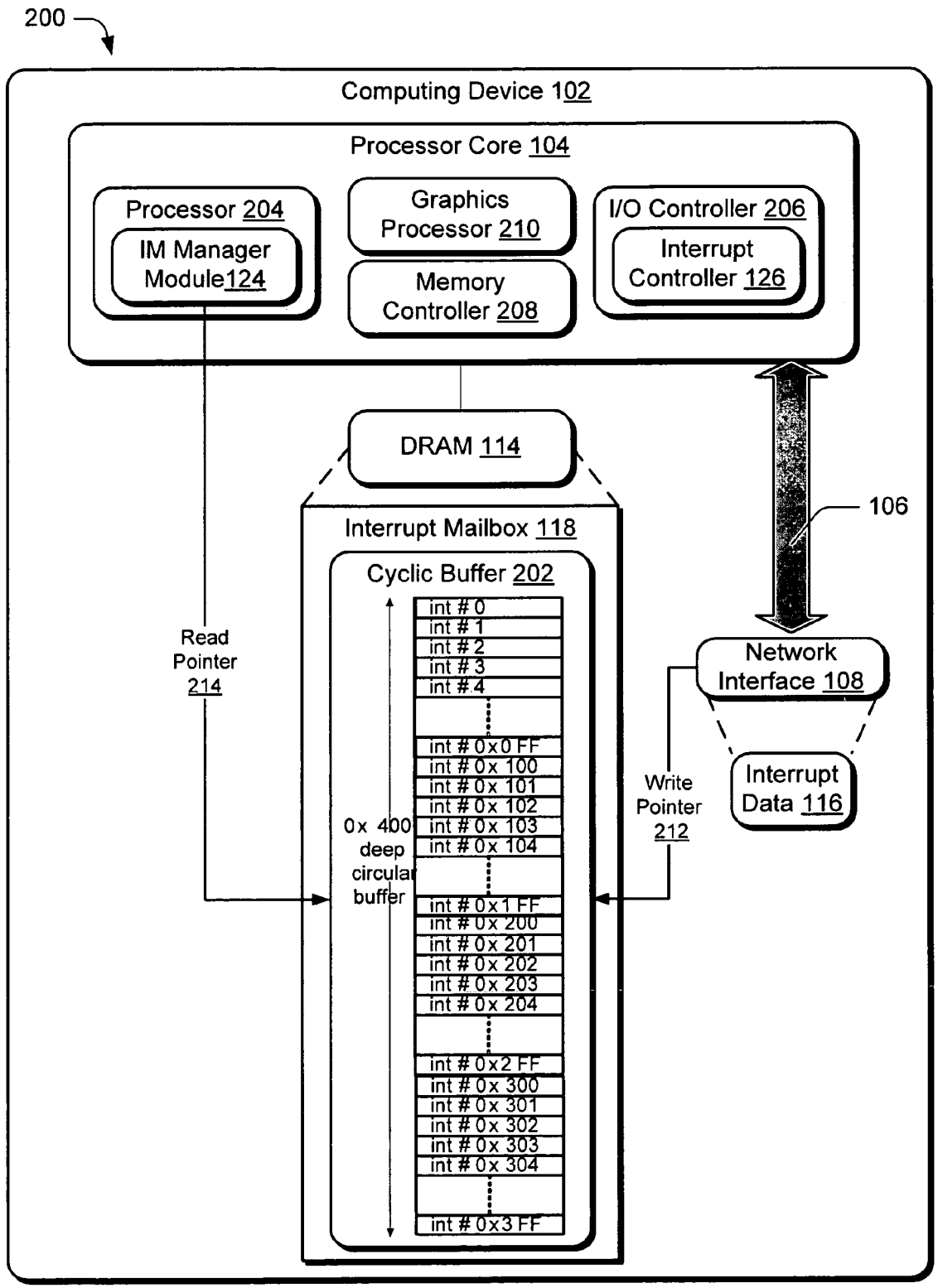
FIG. 2 is an illustration of exemplary implementation of an interrupt mailbox in memory of a host.

FIG. 2 depicts an exemplary implementation 200 showing components of the computing device 102 of FIG. 1 in greater detail. In the depicted embodiment the memory 114 is implemented as "main" memory of the computing device 102 which as illustrated in FIG. 2 may be configured as dynamic random access memory (DRAM) 114. The interrupt mailbox of FIG. 1 is implemented as cyclic buffer 202 which may be defined in the DRAM 114. While a cyclic buffer 202 in DRAM 114 is illustrated, it is contemplated that the mailbox 118 and memory 114 may be configured in variety of ways. For instance, the mailbox may be a relational database, or other suitable data storage and the memory may be configured as static random access memory (SRAM), flash memory, and so forth.

The processor core 104 as noted may be configured in a variety of ways to provide processing, device management, and so forth to the computing device 102. As illustrated the processor core 104 includes one or more processors 204, an input/output controller 206, memory controller 208, and a graphics processor 210. A variety of other arrangements to provide the functionality associated with the processor core 104 are also contemplated. For instance, the graphics processor 210 and memory controller 208 may be integrated; the interrupt controller 126 may be provided separately from the I/O controller 206; one or more of the components illustrated with the processor core 104 may be provided separately from the processor core 104, such as a graphic processor 210 external to the processor core 104; and/or various other contemplated combinations.

The processor 204 represents one or more processors which may be configured in a variety of ways such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

As noted, in the depicted embodiment the interrupt mailbox 118 is configured as a cyclic buffer 202 which may be a logically circular buffer such that elements may be filled and processed in sequence, and then the sequence is repeated starting with the first element again after the last element is processed. To determine where in the interrupt mailbox 118 to perform a write, a write pointer 212 may be maintained by a device to reference a location in the mailbox 118. Similarly, interrupt mailbox manager 124 module, which is depicted in FIG. 2 as executed on processor 204, may have a read pointer 214 to reference a particular location in the interrupt mailbox 118 from which to read data. The pointers 212, 214 may be implemented as counters which are incremented to control where reads/writes of interrupt data 116 to/from the DRAM 114 and mailbox 118 are performed.

In operation, a device may generate an interrupt and associated interrupt data to signal for the attention of a host (e.g., computing device 102). For example, a network interface 108 may have data for transmission over a network which is to be processed in some manner via the processor 204 or other resources of the computing device 102. Thus, network interface 108 may produce an interrupt to signal the computing device 102. Interrupt data 116 associated with the interrupt may be written by the network interface 108 to the mailbox 118 so that the host may quickly access the data when the interrupt is processed. Network interface 108 may send an interrupt message to the processor core 104, surrounding or proximate to the time at which the interrupt data 116 is written to the mailbox 118. For example, the interrupt message may be communicated via the interconnect 106 to the I/O controller 206. More particularly, the interrupt is received via the interrupt controller 126 which in FIG. 2 is integrated with the I/O controller 206. Interrupt controller 126 may also be configured as a stand-alone device. Interrupt controller 126, in response to receiving the interrupt, may set the interrupt for processing, e.g., place the interrupt in a queue or sequence. When the interrupt is due for processing, the interrupt controller 126 may cause execution of and/or call the interrupt mailbox manager 124 module to initiate processing of the interrupt. This may involve communicating to the interrupt mailbox manager 124 an indication that the interrupt has occurred. In response, interrupt mailbox manager 124 module may obtain/access corresponding interrupt data 116 from the interrupt mailbox 118 in DRAM 114. Thus, the memory read by the interrupt mailbox manager 124 module occurs from DRAM 114 and not from memory of the "interrupting"

device, e.g., memory integrated with the network interface 108 in this example. Accordingly, the memory read may be relatively quick compared with traditional techniques in which the interrupt data is maintained at a component device, such as in shared random access memory (SRAM) of the network interface 108. Further, discussion of the operation of interrupt mailbox 118 may be found in relation to the procedures described in reference to FIG. 3-4.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU, CPUs, a processor of a network connection device 116, and so on). The program code can be stored in one or more computer readable memory devices, such as memories, 114, 120 and/or memory of the connected components and devices. The features of the techniques to implement an interrupt mailbox in host memory described below are platform-independent, meaning that the techniques may be implemented on a variety of commercial computing platforms having a variety of processors.

Exemplary Procedures

The following discussion describes interrupt mailbox in host memory techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the exemplary environment and devices of FIGS. 1-2.

Figure 3:
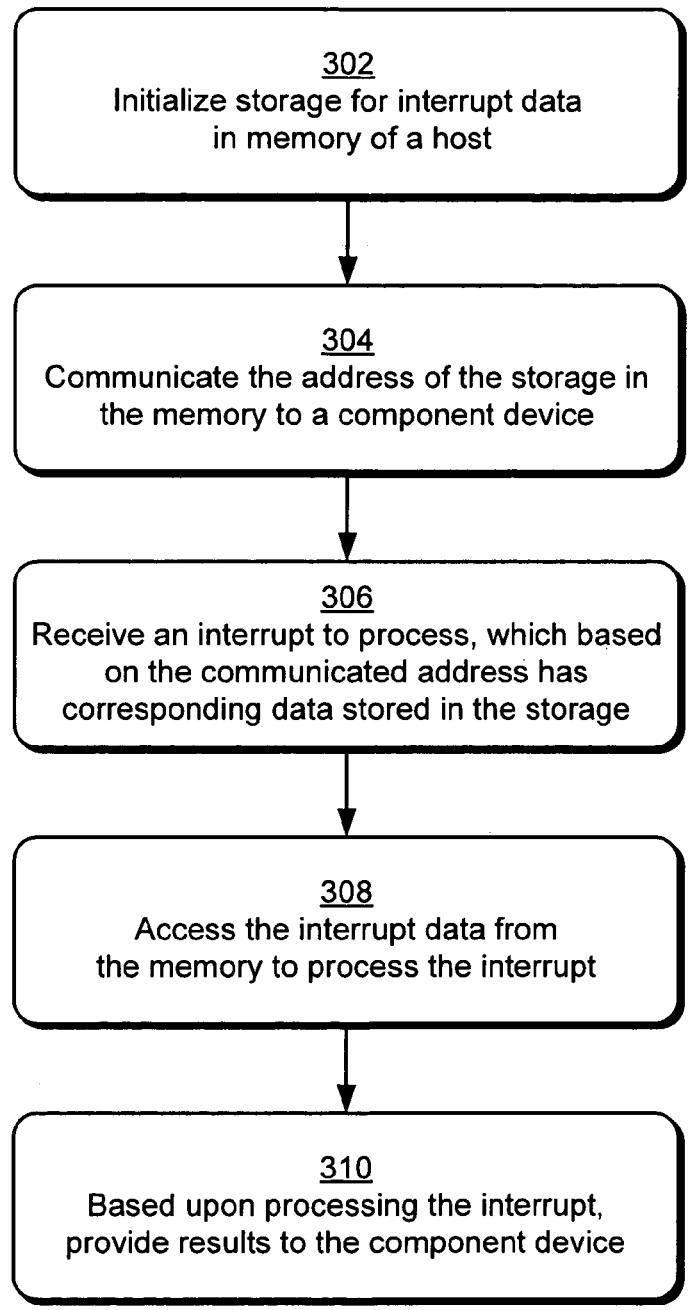
FIG. 3 is a flow diagram depicting a procedure in an exemplary implementation in which a host employs an interrupt mailbox to handle interrupts.

FIG. 3 depicts a procedure in an exemplary implementation in which storage in memory of a host is defined and utilized to process interrupts. In block 302, storage for interrupt data is initialized in memory of a host. For example, the interrupt mailbox manager 124 module of FIG. 2 may be executed via processor 204 to cause an interrupt mailbox 118 to be defined in memory of a computing device 102, such as the illustrated DRAM memory 114. For instance, the interrupt mailbox manager 124 may specify address locations in the memory for a database to maintain interrupt data 116 for one or more components connected to the processor core via the interconnect 06. In an implementation, the database may correspond to a particular device, for example the network interface 108 depicted in FIG. 2. Further, the interrupt mailbox manager 124 may be executed to initialize the interrupt mailbox 118 such as to setting values to default, null or zero values, and the read pointer 214 may be set to a first or default element of the interrupt mailbox 118. In this manner, the interrupt mailbox manager 124 may be configured to read from a location specified in the interrupt mailbox 118 by the read pointer 214. In an embodiment, the interrupt mailbox 118 may be configured to store interrupt data 116 on behalf of a plurality of devices, such as in a common defined storage, in separate tables each corresponding to a particular device, and so on.

In block 304, the location of the storage in the memory is communicated to an associated device. In the previous example the interrupt mailbox manager 124, upon forming the storage (e.g., mailbox 118) in DRAM memory 114, may operate to notify one or more components associated with the interrupt mailbox 118, the location of the storage in the memory. This notification may include addresses of the interrupt mailbox 118 in the memory, the default element, and so forth. In response, the component may configure a write pointer 212 or other suitable referencing data to reference the memory location of the first element. In this manner, the component may be configured to write to a location specified in the interrupt mailbox 118. Then upon generation of an interrupt, the device may among other acts, write data to the host memory 114 and communicate the interrupt to the host (e.g., computing device 102) such as to the I/O controller 206 and/or interrupt controller 126. Further discussion of interrupt handling techniques including acts performed by a device causing an interrupt (an "interrupting" device) may be found in reference to FIG. 4.

In block 306, an interrupt is received for processing which has associated data in the storage. In the preceding example the computing device 102 may receive an interrupt message from a device, such as from the network interface 108 of FIG. 1. In an implementation, the interrupt controller 126 is configured to receive and process interrupts from a plurality of components of an associated computing device 102. Other devices (e.g., devices other than the network interface 108) may also provide interrupts, such as the display 110 and I/O devices 112(n). As noted, interrupts from a plurality of devices may be processed by the controller 126 and data corresponding to these interrupts may be stored via one or more interrupt mailboxes 118.

Each interrupt mailbox 118 may be configured to store data in host memory for one or more of the plurality of devices. Then, the interrupt controller 126 may communicate with and/or cause to be executed the interrupt mailbox manager 124 module corresponding to a received interrupt message and/or associated device(s). For instance, the interrupt controller 126 may call the interrupt mailbox manger module 124 with the interrupt message or an indication that the message was received and/or that the interrupt has occurred. For instance, the interrupt message from a particular component may identify or reference a particular interrupt mailbox 118 configured for storing interrupts data for that device exclusively or for at least that device. Thus, the device at some time surrounding or proximate to sending the interrupt message may have written corresponding interrupt data 116 to the interrupt mailbox 118. This data for example, may be written to a location in the memory which was communicated to the device via the interrupt mailbox manager 124 module. The device may use the write pointer 212 to determine where in the host memory 114 to write the data. Upon writing the data, the device may increment an associated pointer or update reference data to indicate a next element of the mailbox 118. Other examples are also contemplated.

In block 308, the interrupt data is accessed from the memory to process the interrupt. For instance, using the pointer 214, the interrupt mailbox manager 124 may refer to the interrupt data 116 in memory 114 to handle the interrupt. Then, interrupt mailbox manager 124 module may utilize the data 116 to determine one or more responses to an associated interrupt. Based on this determination, resources may be allocated to the "interrupting" device. For instance, processing time or other resources may be allocated to the "interrupting" device based on processing of the interrupt data 116 which is obtained from host memory 114. Additionally or alternatively, status messages and/or other commands may be communicated to the "interrupting" device such as commands to wait, to reinitialize, a busy signal, an error indication, a resend command, and so forth. Thus, a variety of results of processing an interrupt and associated data 116 are contemplated.

In block 310, results are provided to the device based upon the processing of the interrupt. In the above example the interrupt mailbox manager 124 module processes the interrupt data 116 from host memory 114 and provides results to the "interrupting" device such as the network interface 108. The results may be resources from or associated with the host, messages or commands, status indications, notices to wait, and so forth. The "interrupting" device receives the results and may take action(s) based on the results which may include resolving the cause of the interrupt, providing more data to the host, resending the interrupt, and a variety of other actions.

Figure 4:
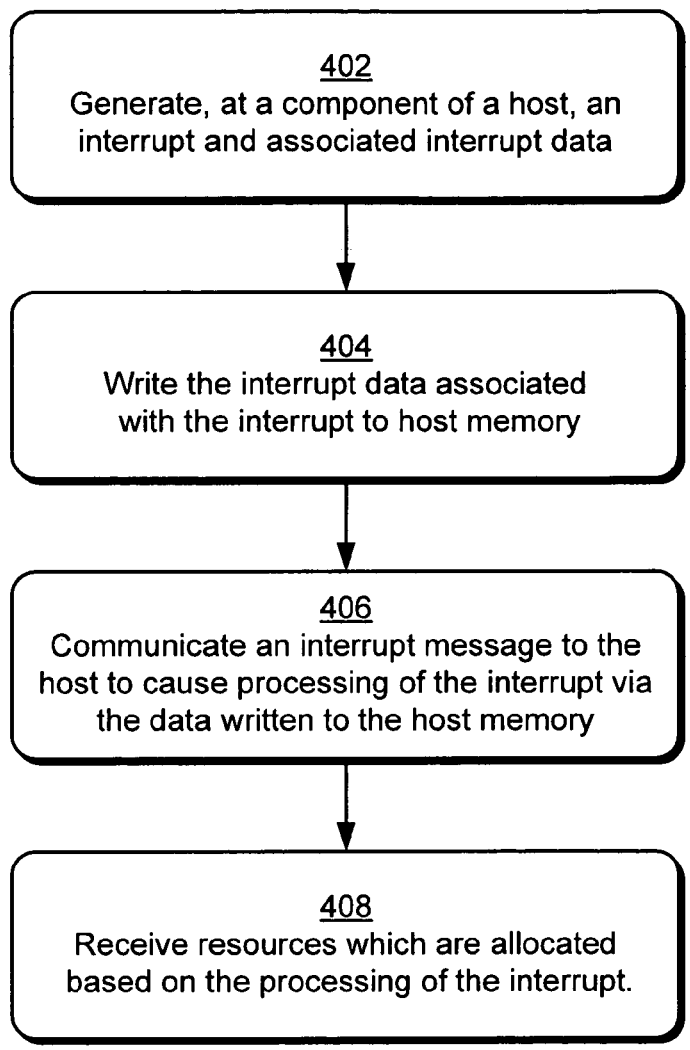
FIG. 4 is a flow diagram depicting a procedure in an exemplary implementation in which a component device writes interrupt data to an interrupt mailbox in memory of a host.

FIG. 4 depicts an exemplary implementation 400 of a procedure in which a component device provides interrupt data to an interrupt mailbox in host memory. In block 402, the component device generates an interrupt. An interrupt is a signal/message or other indication from a device or component requesting that the host attend to the device, typically to provide processing time or other resources. The device causing an interrupt may be referred to generally as the "interrupting" device. A variety of events, tasks, actions, errors and so forth, of components in a host system may cause interrupts to occur. The occurrence of an interrupt may cause the host to save an execution state, and may also cause the operation of functionality for interrupt handling. For instance, the network interface 108 of FIG. 1 may have new data for processing such as when a user performs a file transfer via a network, when email is sent/received, when data is transmitted/received, and so forth. Thus, network interface 108 may cause performance of a variety of associated tasks on the data such as packetizing, serialize/deserialize, encryption, and so forth. To perform these and or other tasks and operations the network interface 108 may seek host resources (e.g., functionality provided via the processor core 104), and accordingly may generate/signal an interrupt. The interrupt may have a variety of associated interrupt data 116 which is relevant to handling of the interrupt. Interrupts from various devices including the network interface 108 may be generated in response to for a variety of events examples of which include read/writes, errors, completions, processing of requests, and other suitable events for which a component may seek the attention of the host, e.g., a request that the host acknowledge the "interrupting" device.

In block 404, data associated with the interrupt is written to memory of the host. In the preceding example, the network interface 108 may be configured to provide interrupt data 116 to the host (e.g., computing device 102). The interrupt data 116 may be configured to include a variety of information relevant to an associated interrupt examples of which include but are not limited to, an identifier of the interrupt, identifier of the "interrupting" device, status of the interrupt, commands, category or classification, priority data and/or other data which the host may utilize to process and/or respond to the interrupt. In traditional techniques, the host may be limited to accessing interrupt data 116 for processing an interrupt from the memory of the "interrupting" device, which is expensive in terms of computing resources and time. For instance, the processor 204 may be stalled or tied up during such a read which slows down the system.

Thus, in accordance with the described techniques, an interrupt mailbox 118 in memory 114 of a host is utilized which may improve performance of interrupt handling. In the embodiment depicted in FIG. 1, the network interface 108 (and/or other devices 110, 112(n) and so forth) may be configured to provide interrupt data 116 associated with an interrupt to the computing device 102, which may be stored in the interrupt mailbox 118. Then, when the computing device 102 is ready to process the interrupt, a quick read to host memory 114 may occur. Thus, the computing device 102 is able to process the interrupt without the relatively expensive read from a memory of the "interrupting" device, e.g., the network interface 108. In one embodiment, the network interface 108 may use a write pointer 212 as in FIG. 2 to identify a location in the mailbox 108 to perform the write.

Optionally, the write to the memory 114 is verified. For instance, the "interrupting" device may perform a read to the location of the write to verify that the data arrived in host memory 114 and/or the integrity of the interrupt data 116. Alternatively, the host such as via interrupt controller 126 and/or interrupt manger module 124 may be configured to provide a completion or other status indication to the "interrupting" device, to express the success of the data write. In the case of a writer pointer 212, the write pointer 212 may be incremented subsequent to the write and/or verification to specify the next position in the interrupt mailbox 108 for the next interrupt and/or write.

In block 406, an interrupt message is communicated to the host to cause processing of the interrupt via the data written to the host memory. Thus, in the above example, the network interface 108 may write interrupt data 116 to the database, e.g., interrupt mailbox 118 which in an implementation may be configured as a cyclic buffer. Then, the interrupt itself (e.g., the interrupt message) is communicated to the host device (e.g., to the computing device 102) to cause processing of the interrupt.

The interrupts, for instance, may be message-signaled interrupts (MSI). A message-signaled interrupt system employs short messages, e.g., MSIs, which are provided by a device to signal a request for the attention of the host. The MSI's may be communicated over a communications medium, such as an interconnect through which the device is connected to the host system. Typically, MSI messages are small in size and therefore may not be large enough to contain all the interrupt data 116 associated with the interrupt. Rather the MSIs are an indication that the "interrupting" device seeks attention. In an implementation, the MSIs or other interrupts may be communicated via the interconnect 106 of FIGS. 1-2. Further, in an embodiment, the interconnect 106 may configured as a PCI or PCI-e interconnect which is suitable for communication of interrupt messages among interconnected components of a host system.

For example, referring to FIG. 2 the network interface 108 may communicate via interconnect 106 an interrupt to the interrupt controller 126 which causes the computing device 102 to respond, such as via execution of the interrupt mailbox manager 124 module to handle the communicated interrupt. As described with reference to FIG. 3, the interrupt mailbox manager 124 module may operate to obtain interrupt data 116 for processing an associated interrupt from the interrupt mailbox 118 which is maintained in host memory 114. As previously noted, interrupt mailbox manager 124 module may utilize a read pointer 214 to determine where in the host memory 114 to read interrupt data 116 from. The read pointer 214 may be incremented subsequent to a read to position the read pointer 214 for the next interrupt.

In block 408, resources are received which are allocated based on processing of the interrupt. For example, the "interrupting" device in the above examples may receive resources which are requested and/or sufficient to respond to and/or address the cause of the interrupt communicated the computing device 102. A variety of resources and or results are contemplated as discussed with respect to FIG. 3. In the present example, the network interface 108 having new data for processing may be allocated processor time or other resources associated with the processor core 204 and/or computing device 102, in response to processing of the generated interrupt data 116 and interrupt (e.g., MSI) which are communicated to the computing device 102 (e.g., host). Thus, the new data of the network interface 108 may be processed in a variety of ways, such as by being packetized for transmission via a network, serialized, de-serialized, encrypted, and so forth.

CONCLUSION

Although the interrupt mailbox devices and techniques has been described in language specific to structural features and/or methodological acts, it is to be understood that the appended claims are not necessarily limited to the specific features or acts described. Rather, the specific features and acts are disclosed as exemplary forms of implementing the claimed devices and techniques.

What is claimed is:

1. An apparatus comprising:
an interconnect to connect a plurality of devices to a host;
a host memory;
a plurality of interrupt mailboxes defined in the host memory to store data for processing, wherein each interrupt mailbox corresponds to a single device, and wherein the data corresponds to an interrupt received via the interconnect from a particular device; and
an interrupt controller to:
receive an interrupt message communicated by the particular device to alert the host to the interrupt; and
responsive to the interrupt message:
cause execution of the module to process the interrupt via the associated data for processing stored in the interrupt mailbox; and
cause communication of status messages and a command to the particular device, wherein the command is selected from a group comprising:
wait;
reinitialize;
busy;.
error indication; or
resend.

2. An apparatus as recited in claim 1, wherein the interconnect is a peripheral component interconnect (PCI) interconnect.

3. An apparatus as recited in claim 1, wherein the interconnect is a peripheral component interconnect express (PCI-e) interconnect.

4. An apparatus as recited in claim 1, wherein the interrupt mailbox comprises a cyclic buffer.

5. An apparatus as recited in claim 1, wherein the particular device is a network interface device.

6. An apparatus as recited in claim 1, wherein the host memory comprises dynamic random access memory (DRAM).

7. An apparatus as recited in claim 1 wherein the memory is separate from the particular device which produces the data for processing.

8. An apparatus as recited in claim 1 wherein the host is to process interrupts from the particular device via the interrupt mailbox, such that the host does not read the data for processing from memory integrated with the particular device.

9. One or more computer-readable storage media comprising executable instructions that, when executed, direct a processor core of a computing device to define an interrupt database in dynamic random access memory (DRAM) of the computing device to store data for processing associated with at least one interrupt for at least one component device connected to the processor core;
receive an indication of an interrupt generated by the component device; and
responsive to the indication:
access corresponding data for processing from the interrupt database to process the interrupt, wherein the data for processing is written by the component device to interrupt database; and
communicate status messages and a command to the at least one component device connected to the processor core, wherein the command is selected from a group comprising:
wait;
reinitialize;
busy;
error indication; or
resend.

10. One or more computer-readable storage media as described in claim 9, wherein the component device is a network interface device configured to provide the computing device with a connection to one or more networks.

11. One or more computer-readable storage media as described in claim 9, wherein the component device is connected to the processor core via a peripheral component interconnect express (PCI-e) interconnect.

12. A system comprising:
an interconnect to connect a plurality of devices to a host;
a host dynamic random access memory (DRAM); and
a plurality of interrupt mailboxes defined in the host DRAM to store data for processing, wherein each interrupt mailbox corresponds to a single device, and the data being associated with an interrupt received via the interconnect from a particular device; and
an interrupt controller to:
receive an interrupt message communicated by the particular device to alert the host to the interrupt; and
responsive to the interrupt message:
cause execution of the module to process the interrupt via the associated data for processing stored in the interrupt mailbox; and
cause communication of status messages and a command to the particular device, wherein the command is selected from a group comprising:
wait;
reinitialize;
busy;
error indication; or
resend.

13. A system as described in claim 12, wherein:
the particular device is a network interface; and
the interconnect is configured as a peripheral component interconnect express (PCI-e) interconnect.

* * * * *